US012811868B2

(12) United States Patent
Rajput et al.

(10) Patent No.: US 12,811,868 B2
(45) Date of Patent: Nov. 24, 2026

(54) METHODS, SYSTEMS, AND COMPUTER READABLE MEDIA FOR NETWORK ANALYTICS DATA DIRECTOR (NADD)-ASSISTED PRODUCER NETWORK FUNCTION (NF) SELECTION

(71) Applicant: Oracle International Corporation, Redwood Shores, CA (US)

(72) Inventors: Jay Rajput, Bangalore (IN); Virendra Singh, Bangalore (IN); Shashikiran Bhalachandra Mahalank, Bangalore (IN); Ashish Kumar, Gurgaon (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1 day.

(21) Appl. No.: 18/826,073

(22) Filed: Sep. 5, 2024

(65) Prior Publication Data

US 2026/0067193 A1 Mar. 5, 2026

(51) Int. Cl.
*H04L 43/0852* (2022.01)
*H04L 41/14* (2022.01)
*H04L 41/40* (2022.01)

(52) U.S. Cl.
CPC .......... *H04L 43/0852* (2013.01); *H04L 41/14* (2013.01); *H04L 41/40* (2022.05)

(58) Field of Classification Search
CPC ...... H04L 43/0852; H04L 41/14; H04L 41/40
See application file for complete search history.

(56) References Cited

U.S. PATENT DOCUMENTS 10,592,317 B2 3/2020 Baines et al.
11,140,047 B2 * 10/2021 Shan .................. H04L 41/0895
(Continued)

FOREIGN PATENT DOCUMENTS

CN 114980200 A 8/2022
IN 202241006739 A 11/2023
(Continued)

OTHER PUBLICATIONS

3rd Generation Partnership Project; Technical Specification Group Core Network and Terminals; 5G System; Network Function Repository Services; Stage 3 (Release 19) 3GPP TS 29.510 V19.0.0 (Sep. 2024).
(Continued)

*Primary Examiner* — Jimmy H Tran
(74) *Attorney, Agent, or Firm* — Jenkins, Taylor & Hunt, P.A.

(57) ABSTRACT

A method for network analytics data director (NADD)-assisted producer network function (NF) selection includes receiving, at the NADD and from consumer NFs, copies of service-based interface (SBI) messages transmitted to and received from producer NFs. The method further includes calculating, by the NADD, delay values associated with transport and processing of the SBI messages by the producer NFs. The method further includes providing, by the NADD, the delay values to a consumer NF. The method further includes using, by the consumer NF, the delay values to select a producer NF for processing an SBI request message originated or received by the consumer NF. The method further includes transmitting, by the consumer NF, the SBI request message to the producer NF.

14 Claims, 6 Drawing Sheets

(56) References Cited

U.S. PATENT DOCUMENTS

| | | | | |
|---|---|---|---|---|
| 11,811,863 | B2 * | 11/2023 | Shariat | H04L 67/1034 |
| 11,917,016 | B2 * | 2/2024 | Krishan | H04L 67/141 |
| 12,500,826 | B2 * | 12/2025 | Sofuoglu | H04L 43/0852 |
| 12,732,565 | B2 | 9/2026 | Rajput et al. | |
| 2018/0262924 | A1 * | 9/2018 | Dao | H04W 72/535 |
| 2019/0222489 | A1 * | 7/2019 | Shan | H04M 15/66 |
| 2020/0288296 | A1 * | 9/2020 | Fiorese | H04W 64/006 |
| 2020/0313999 | A1 * | 10/2020 | Lee | H04L 43/0847 |
| 2020/0336554 | A1 * | 10/2020 | Deshpande | H04L 67/02 |
| 2021/0021494 | A1 * | 1/2021 | Yao | H04L 41/0631 |
| 2022/0053372 | A1 * | 2/2022 | Shekhar | H04L 41/40 |
| 2022/0330085 | A1 * | 10/2022 | Li | H04L 67/51 |
| 2022/0345379 | A1 * | 10/2022 | Li | H04L 67/561 |
| 2022/0385735 | A1 * | 12/2022 | Yang | H04L 63/168 |
| 2023/0033997 | A1 | 2/2023 | Askerup et al. | |
| 2023/0042219 | A1 | 2/2023 | Singh et al. | |
| 2023/0065199 | A1 | 3/2023 | Khare et al. | |
| 2023/0171182 | A1 | 6/2023 | Goel et al. | |
| 2023/0217355 | A1 | 7/2023 | Srivastava et al. | |
| 2023/0269608 | A1 * | 8/2023 | Puente Pestaña | H04W 24/02 370/252 |
| 2023/0291818 | A1 * | 9/2023 | Yang | H04L 67/563 |
| 2023/0300200 | A1 | 9/2023 | Krishan | |
| 2023/0359528 | A1 | 11/2023 | Mouroulis et al. | |
| 2023/0362267 | A1 * | 11/2023 | Landais | H04L 67/51 |
| 2024/0031430 | A1 * | 1/2024 | Shariat | H04L 67/1034 |
| 2024/0172035 | A1 * | 5/2024 | Chunduri | H04L 41/122 |
| 2024/0187878 | A1 | 6/2024 | Chu et al. | |
| 2024/0298225 | A1 * | 9/2024 | Hyde | H04W 36/0083 |
| 2024/0348523 | A1 * | 10/2024 | Sofuoglu | H04L 43/0852 |
| 2024/0430168 | A1 * | 12/2024 | Lu | H04L 47/10 |
| 2025/0071094 | A1 | 2/2025 | Rajput et al. | |
| 2025/0175491 | A1 | 5/2025 | Mohan Raj et al. | |
| 2025/0184238 | A1 * | 6/2025 | Singh | H04L 43/18 |
| 2025/0193287 | A1 * | 6/2025 | Li | H04L 67/56 |
| 2025/0203433 | A1 * | 6/2025 | Kheirkhah | H04W 24/02 |
| 2025/0234187 | A1 | 7/2025 | Mohan Raj et al. | |
| 2025/0267070 | A1 * | 8/2025 | An | H04L 41/147 |
| 2025/0310862 | A1 * | 10/2025 | Saride | H04W 48/14 |
| 2026/0067752 | A1 | 3/2026 | Chellasamy et al. | |
| 2026/0122142 | A1 | 4/2026 | Rajput et al. | |
| 2026/0197378 | A1 | 7/2026 | Mukherjee et al. | |

FOREIGN PATENT DOCUMENTS

| | | | |
|---|---|---|---|
| WO | WO 2019/038684 | A1 | 2/2019 |
| WO | WO 2019/215308 | A1 | 11/2019 |
| WO | WO 2026/147681 | A1 | 7/2026 |

OTHER PUBLICATIONS

3rd Generation Partnership Project; Technical Specification Group Core Network and Terminals; 5G System; Technical Realization of Service Based Architecture; Stage 3 (Release 19) 3GPP TS 29.500 V19.0.0 (Sep. 2024).

3rd Generation Partnership Project; Technical Specification Group Core Network and Terminals; 5G System; Session Management Policy Control Service; Stage 3 (Release 19) 3GPP TS 29.512 V19.0.0 (Sep. 2024).

3rd Generation Partnership Project; Technical Specification Group Core Network and Terminals; 5G System; Binding Support management Service; Stage 3 (Release 19) 3GPP TS 29.521 V19.0.0 (Sep. 2024).

3rd Generation Partnership Project; Technical Specification Group Core Network and Terminals; 5G System; Usage of the Unified Data Repository service for Policy Data, Application Data, and Structured Data for Exposure; Stage 3 (Release 19) 3GPP TS 29.519 V19.0.1 (Sep. 2024).

3rd Generation Partnership Project; Technical Specification Group Core Network and Terminals; 5G System; Spending Limit Control Service; Stage 3 (Release 19) 3GPP TS 29.594 V19.0.0 (Sep. 2024).

"5G; 5G System; Session Management Services; Stage 3 (3GPP TS 29.502 version 16.6.0 Release 16)", ETSI TS 129 502, V16.6.0, pp. 1-283 (Jan. 2021).

"Clarifications for Indirection Communications", Nokia, 3GPP TSG-CT WG4 Meeting #99e, E-Meeting, C4-204189, pp. 1-5 (Aug. 18-28, 2020).

"5G; 5G System; Technical Realization of Service Based Architecture; Stage 3 (3GPP TS 29.500 version 15.3.0 Release 15)", ETSI TS 129 500, V15.3.0, pp. 1-36 (Jul. 2019).

"3rd Generation Partnership Project; Technical Specification Group Core Network and Terminals; 5G System; Technical Realization of Service Based Architecture; Stage 3 (Release 18)", 3GPP TS 29.500, V18.7.0, pp. 1-151 (Sep. 2024).

Commonly-assigned, co-pending U.S. Appl. No. 19/009,897 for "Methods, Systems, and Computer Readable Media for Intelligent Admission Control in Service-Based Interface Network Functions," (Unpublished, filed Jan. 3, 2025).

Commonly-assigned, co-pending U.S. Appl. No. 18/816,840 for Methods, Systems, and Computer Readable Media for Dynamically Adjusting Producer Network Function (NF) Service-Based Interface (SBI) Response Message Processing Timeouts at Service.

"3rd Generation Partnership Project; Technical Specification Group Services and System Aspects; Procedures for the 5G System (5GS); Stage 2 (Release 18)", 3GPP TS 23.502, V18.6.0, pp. 1-717 (Jun. 2024).

"3rd Generation Partnership Project; Technical Specification Group Services and System Aspects; System architecture for the 5G System (5GS); Stage 2 (Release 19)", 3GPP TS 23.501, V19.0.0, pp. 1-722 (Jun. 2024).

"3rd Generation Partnership Project; Technical Specification Group Core Network and Terminals; 5G System; Technical Realization of Service Based Architecture; Stage 3 (Release 18)", 3GPP TS 29.500, V18.6.1, pp. 1-151 (Aug. 2024).

"3rd Generation Partnership Project; Technical Specification Group Core Network and Terminals; 5G System; Network Function Repository Services; Stage 3 (Release 18)", 3GPP TS 29.510 V18.7.0, pp. 1-426 (Jun. 2024).

"3rd Generation Partnership Project; Technical Specification Group Core Network and Terminals; 5G System; Technical Realization of Service Based Architecture; Stage 3 (release 18)", 3GPP TS 29.500, V18.6.0, pp. 1-151 (Jun. 2024).

Commonly-Assigned, co-pending U.S. Appl. No. 18/934,178 for "Methods, Systems, and Computer Readable Media for Network Analytics Data Director (NADD)-Informed Automatic Configuration of Maximum Response Times." (Unpublished filed Oct. 31. 2024).

"5G; 5G System; Session Management Services; Stage 3 (3GPP TS 29.502, V16.6.0 Release 16)" ETSI TS 129 502, V16.6.0, pp. 1-283 (Jan. 2021).

Esfandiari, "Powering the Autonomous 5G Core", Pipeline Publishing, L.L.C., vol. 19, Issue 11, pp. 1-4 (2023).

Nadar, et al., "Enhancing Network Data Analytics Functions: Integrating AIaaS with ML Model Provisioning", 2024 22nd Mediterranean Communication and Computer Networking Conference (MedComNet). IEEE, pp. 1-4 (2024).

Garcia-Martin, et al., "Network automation and data analytics in 3gpp 5g systems." IEEE Network 38.4 (2023): 182-189.

Chouman, et al., "A Modular, End-to-End Next-Generation Network Testbed: Towards a Fully Automated Network Management Platform", arXiv.org, arXic:2403.15376v1, pp. 1-47 (Mar. 22, 2024).

Nokia, "Clarifications for Indirect Communications", 3GPP TSG-CT WG4 Meeting #99e, pp. 1-5 (Aug. 18-28, 2020).

Fielding, et al., "Hypertext Transfer Protocol (HTTP/1.1): Message Syntax and Routing", Internet Engineering Task Force (IETF), RFC 7230 (Jun. 2014).

"3rd Generation Partnership Project; Technical Specification Group Core Network and Terminals; 5G System; Technical Realization of Service Based Architecture; Stage 3 (Release 18)", 3GPP TS 29.500, V18.7.0, pp. 1- (Sep. 2024).

"3rd Generation Partnership Project; Technical Specification Group Core Network and Terminals; 5G System; Network Function Repository Services; Stage 3 (Release 19)", 3GPP TS 29.510, V19.0.0, pp. 1-435 (Sep. 2024).

(56) References Cited

OTHER PUBLICATIONS

Notification of Transmittal of the International Search Report and the Written Opinion of the International Searching Authority, or the Declaration for International Patent Application Serial No. PCT/US2025/059711 (Apr. 21, 2026).
Notice of Allowance for U.S. Appl. No. 18/934,178 (Apr. 20, 2026).
Notice of Allowance for U.S. Appl. No. 19/009,897 (Jun. 23, 2026).
Notice of Allowance for U.S. Appl. No. 18/816,840 (Jun. 18, 2026).

* cited by examiner

METHODS, SYSTEMS, AND COMPUTER READABLE MEDIA FOR NETWORK ANALYTICS DATA DIRECTOR (NADD)-ASSISTED PRODUCER NETWORK FUNCTION (NF) SELECTION

TECHNICAL FIELD

The subject matter described herein relates to routing messages in communications networks. More particularly, the subject matter described herein relates to using service based interface (SBI) message processing and transport delays calculated by a network analytics data director to inform producer NF selection.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One issue that can arise in 5G, previous generation, and subsequent generation networks is that an SCP acting as a consumer NF may select a producer NF to process an SBI request message received by the SCP, the producer NF may receive the SBI request message outside of a maximum response processing time window specified by the message originator, and the producer NF may reject the SBI request message. Request rejection is expensive for the network and the entities involved. It is desirable that the consumer NF select a producer NF in a manner that reduces the likelihood of SBI message rejection by the NF service producer.

Accordingly, in light of these and other difficulties, there exists a need for improved methods, systems, and computer readable media for producer NF selection.

SUMMARY

A method for network analytics data director (NADD)-assisted producer network function (NF) selection includes receiving, at the NADD and from consumer NFs, copies of service-based interface (SBI) messages transmitted to and received from producer NFs. The method further includes calculating, by the NADD, delay values associated with transport and processing of the SBI messages by the producer NFs. The method further includes providing, by the NADD, the delay values to a consumer NF. The method further includes using, by the consumer NF, the delay values to select a producer NF for processing an SBI request message originated or received by the consumer NF. The method further includes transmitting, by the consumer NF, the SBI request message to the producer NF.

According to another aspect of the subject matter described herein, receiving the copies of the SBI messages includes receiving SBI message feeds from consumer NFs.

According to another aspect of the subject matter described herein, receiving the copies of the SBI messages from the consumer NFs includes receiving the copies of the SBI request messages from at least one service communication proxy (SCP).

According to another aspect of the subject matter described herein, calculating the delay values includes, for a producer NF, receiving copies of an SBI request message transmitted by the consumer NF and a corresponding SBI response message received by the consumer NF and calculating one of the delay values based on a difference in time between transmission of the SBI request message by the consumer NF and receipt of the SBI response message by the consumer NF.

According to another aspect of the subject matter described herein, calculating the delay values includes calculating average or median delay values experienced by the consumer NFs in receiving services from the producer NFs.

According to another aspect of the subject matter described herein, calculating the delay values includes continually updating the delay values based on the SBI messages transmitted to and received from the producer NFs.

According to another aspect of the subject matter described herein, providing the delay values to the consumer NF includes providing the delay values to a service communication proxy (SCP).

According to another aspect of the subject matter described herein, using the delay values to select a producer NF to process an SBI request message originated by or received by the consumer NF includes using, by the SCP, the delay values to select a producer NF to process an SBI request message received by the SCP.

According to another aspect of the subject matter described herein, using the delay values to select a producer NF to process the SBI request message received by the SCP comprises excluding, as candidates for processing the SBI request message, producer NFs for which the calculated delay value exceeds:

(sender timestamp + max response time)−current time, where current time is a current time at the SCP when the SCP receives the SBI request message, sender timestamp is a timestamp value obtained from a 3gpp-Sbi-Sender-Timestamp header of the SBI request message, and max response time is a maximum response time value obtained from a 3gpp-Sbi-Max-Rsp-Time header of the SBI request message.

According to another aspect of the subject matter described herein, providing the delay values to the consumer NF includes providing the delay values as part of an analytics data feed from the NADD to the consumer NF and/or in response to queries from the consumer NF.

According to another aspect of the subject matter described herein, a system for network analytics data director (NADD)-assisted producer network function (NF) selection is provided. The system includes a network analytics data director (NADD) including at least one processor for receiving, at the NADD and from consumer NFs, copies of service-based interface (SBI) messages transmitted to and received from producer NFs, calculating delay values associated with transport and processing of the SBI messages by the producer NFs, and communicating the delay values to other NFs. The system further includes a consumer NF including at least one processor for receiving, from the NADD, the delay values, using the delay values to select a producer NF for processing an SBI request message originated or received by the consumer NF, and transmitting the SBI request message to the producer NF.

According to another aspect of the subject matter described herein, the NADD is configured to receive the copies of the SBI messages by receiving SBI message feeds from consumer NFs.

According to another aspect of the subject matter described herein, the NADD is configured to receive the copies of the SBI request messages from at least one service communication proxy (SCP).

According to another aspect of the subject matter described herein, the NADD is configured to calculate the delay values by, for a producer NF, receiving copies of an SBI request message transmitted by the consumer NF and a corresponding SBI response message received by the consumer NF and calculating one of the delay values based on a difference in time between transmission of the SBI request message by the consumer NF and receipt of the SBI response message by the consumer NF.

According to another aspect of the subject matter described herein, the NADD is configured to calculate the delay values by calculating average or median delay values experienced by the consumer NFs in receiving services from the producer NFs.

According to another aspect of the subject matter described herein, the NADD is configured to continually update the delay values based on the SBI messages transmitted to and received from the producer NFs.

According to another aspect of the subject matter described herein, the consumer NF comprises a service communication proxy (SCP).

According to another aspect of the subject matter described herein, the SCP is configured to use the delay values to select a producer NF to process an SBI request message received by the SCP.

According to another aspect of the subject matter described herein, the SCP is configured to exclude, as candidates for processing the SBI request message, producer NFs for which the calculated delay value exceeds:

(sender timestamp + max response time)−current time, current time is a current time at the SCP when the SCP receives the SBI request message, sender timestamp is a timestamp value obtained from a 3gpp-Sbi-Sender-Timestamp header of the SBI request message, and max response time is a maximum response time value obtained from a 3gpp-Sbi-Max-Rsp-Time header of the SBI request message.

According to another aspect of the subject matter described herein, one or more non-transitory computer readable medium having stored thereon executable instructions that when executed by one or more processors control the one or more processors to perform steps are provided. The steps include receiving, at a network analytics data director (NADD) and from consumer NFs, copies of service-based interface (SBI) messages transmitted to and received from producer NFs. The steps further include calculating, by the NADD, delay values associated with transport and processing of the SBI messages by the producer NFs. The steps further include providing, by the NADD, the delay values to a consumer NF. The steps further include using, by the consumer NF, the delay values to select a producer NF for processing an SBI request message originated or received by the consumer NF. The steps further include transmitting, by the consumer NF, the SBI request message to the producer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
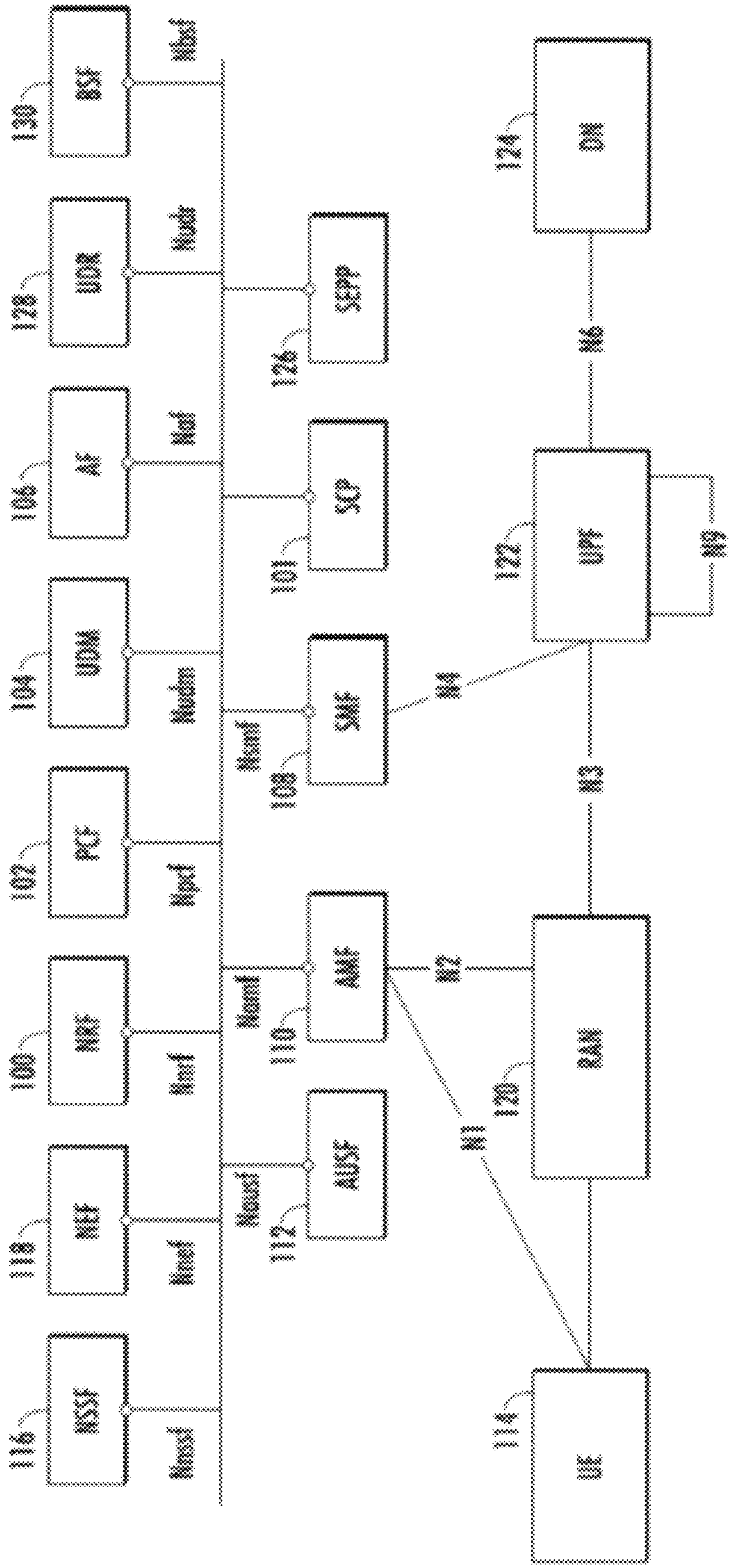
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one issue in 5G, previous generation, and subsequent generation networks is that a producer NF may reject a request if the producer NF finds that the value specified in the 3gpp-Sbi-Max-Rsp-Time header does not allow enough time to process the request. Request rejection can be expensive for the network and the entities involved. It is desirable that the NF service consumer select an NF service producer to process an SBI request only after ensuring that the SBI request will not be rejected due to the transport or processing delays at the NF service producer.

The subject matter described herein uses the network analytics data director (NADD) to calculate transport and processing delays of NF service producers and provide the delay values to the NF service consumer. The NF service consumer uses the delay values to avoid selection of producer NFs that will likely be unable to process an SBI request within the time window specified in the 3gpp-Sbi-Max-Rsp-Time header.

A consumer NF or SCP acting as an SCP can use time values in an SBI request message along with the NADD-calculated producer NF delay values to determine whether a producer NF should be considered as a candidate for processing an SBI request message. One of the values is a timestamp value carried in a 3gpp-Sbi-Sender-Timestamp header of an SBI request message. The 3gpp-Sbi-Sender-Timestamp header is defined in section 5.2.3.3.2 of 3GPP TS 29.500. The header contains the date and time (with millisecond granularity) at which an HTTP request or response is originated. The encoding of the header follows the ABNF as defined in IETF RFC 7230 and is defined as follows:

```
3gpp-Sbi-Sender-Timestamp = "3gpp-Sbi-Sender-Timestamp" ":" OWS day-name "," SP date1 SP time-of-day "." milliseconds SP
GMT
milliseconds = 3DIGIT
day-name, date1, time-of-day shall comply with the definition in clause 7.1.1.1 of IETF RFC 7231.
```

When a 3gpp-Sbi-Sender-Timestamp header field is generated, the sender should generate its field value as the best available approximation of the date and time of message generation. This is the same format as the Date header of clause 7.1.1.2 of IETF RFC 7231, but with the time expressed with millisecond granularity. An example of a 3gpp-Sbi-Sender-Timestamp header is as follows:

EXAMPLE: 3gpp-Sbi-Sender-Timestamp: Sun, 4 Aug. 2019 08:49:37.845 GMT

Another value that can be used by a consumer NF or an SCP acting as a consumer NF to perform producer NF selection is the 3gpp-Sbi-Max-Rsp-Time header defined in clause 5.2.3.3.3 of 3GPP TS 29.500. The 3gpp-Sbi-Max-Rsp-Time header indicates the duration, expressed in milliseconds since the request was originated, during which the HTTP client waits for a response. See clause 6.11.2. The encoding of the header follows the ABNF as defined in IETF RFC 7230. The encoding and an example are as follows.

```
3gpp-Sbi-Max-Rsp-Time = "3gpp-Sbi-Max-Rsp-Time" ":"
OWS 1*5DIGIT
EXAMPLE: 3gpp-Sbi-Max-Rsp-Time: 10000
```

Clause 4.3 of 3GPP TS 29.500 describes detection and handling of late arriving requests. It is suggested to use the 3gpp-Sbi-Sender-Timestamp and 3gpp-Sbi-Max-Rsp-Time at the NF Service producer for rejecting messages that arrive late. However, the specifications do not describe or suggest propagation of NF service producer processing delays in the network.

An HTTP client originating a request may include in the request the 3gpp-Sbi-Sender-Timestamp and the 3gpp-Sbi-Max-Rsp-Time headers indicating respectively the absolute time at which the request is originated and the maximum time period to complete the processing of the request. Both headers together indicate the absolute time at which the request times out at the HTTP client.

Figure 2:
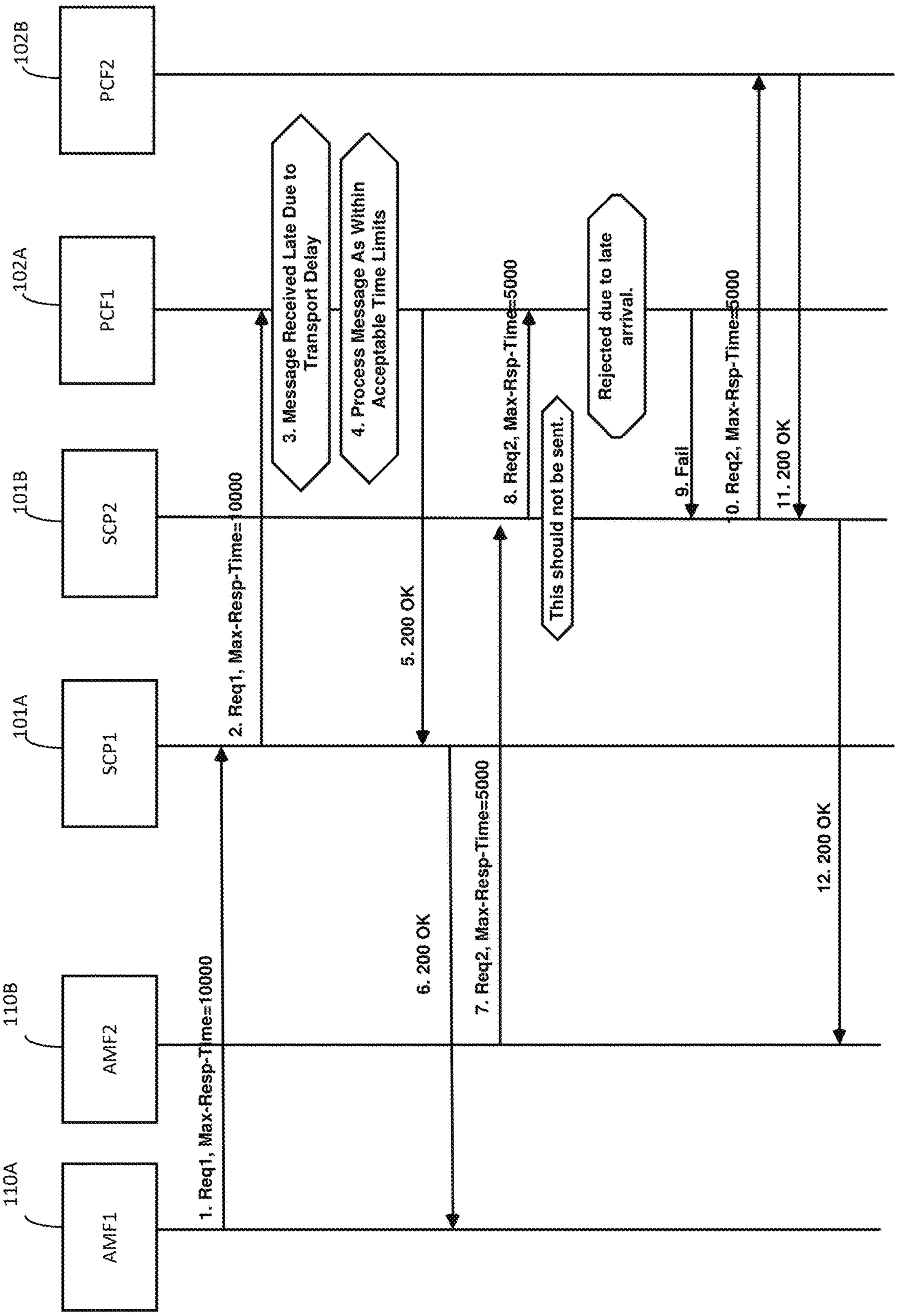
FIG. 2 is a message flow diagram in which an SCP acting as a consumer NF selects a producer NF that is unable to process an SBI request message within the specified time period.

An NF service producer can reject an SBI message based on the 3gpp-Sbi-Sender-Timestamp and 3gpp-Sbi-Max-Rsp-Time headers. Because the NF service consumer has no insight into NF service producer transport and processing delays, the NF service consumer has no way of knowing in advance not to select an NF service producer that is unable to process an SBI request within the time period defined by the 3gpp-Sbi-Sender-Timestamp and 3gpp-Sbi-Max-Rsp-Time headers. FIG. 2 is a message flow diagram in which an SCP acting as a consumer NF selects a producer NF that is unable to process an SBI request message within the specified time period. Referring to FIG. 2, in step 1, AMF 110A sends an SBI request message to SCP 101A. The SBI request message includes 3gpp-Sbi-Max-Rsp-Time-header carrying a value of 10,000 milliseconds. SCP 101A receives the SBI request message and, in step 2, forwards the SBI request message along with the 3gpp-Sbi-Max-Rsp-Time header to PCF 102A. In step 3, PCF 102A receives the message with some delay but within the time period specified by the 3gpp-Sbi-Max-Rsp-Time and the 3gpp-Sbi-Sender-Timestamp headers. Accordingly, in step 4, PCF 102A processes the SBI request and, in step 5, sends a 200 OK message to SCP 101A. In step 6, SCP 101A forwards the response message to AMF 110A.

In step 7, AMF 110B generates and sends an SBI request message to SCP 101B. The SBI request message includes a 3gpp-Sbi-Max-Rsp-Time header carrying a value of 5000 milliseconds. In step 8, SCP 101B forwards the SBI request message including the 3gpp-Sbi-Max-Rsp-Time header carrying the value of 5000 milliseconds (ms) to PCF 102A. However, the request in step 8 should not be sent because PCF 102A is unable to process the message within the allotted time period due to the late arrival of the message. Accordingly, in step 9, PCF 102A rejects the message and sends a failure response to SCP 101B. In step 10, SCP 101B alternate routes the SBI request to PCF 102B. PCF 102B is able to process the SBI request within the specified time period and, in step 11, responds with a 200 OK message. In step 12, SCP 101B forwards the 200 OK message to AMF 110B.

The call flow illustrated in FIG. 2 is problematic because the SBI request message in step 8 should not have been sent to PCF 102A. However, because SCP 101B lacked the producer NF delay information, SCP 101B was unable to avoid selection of PCF 102A.

Figure 3A:
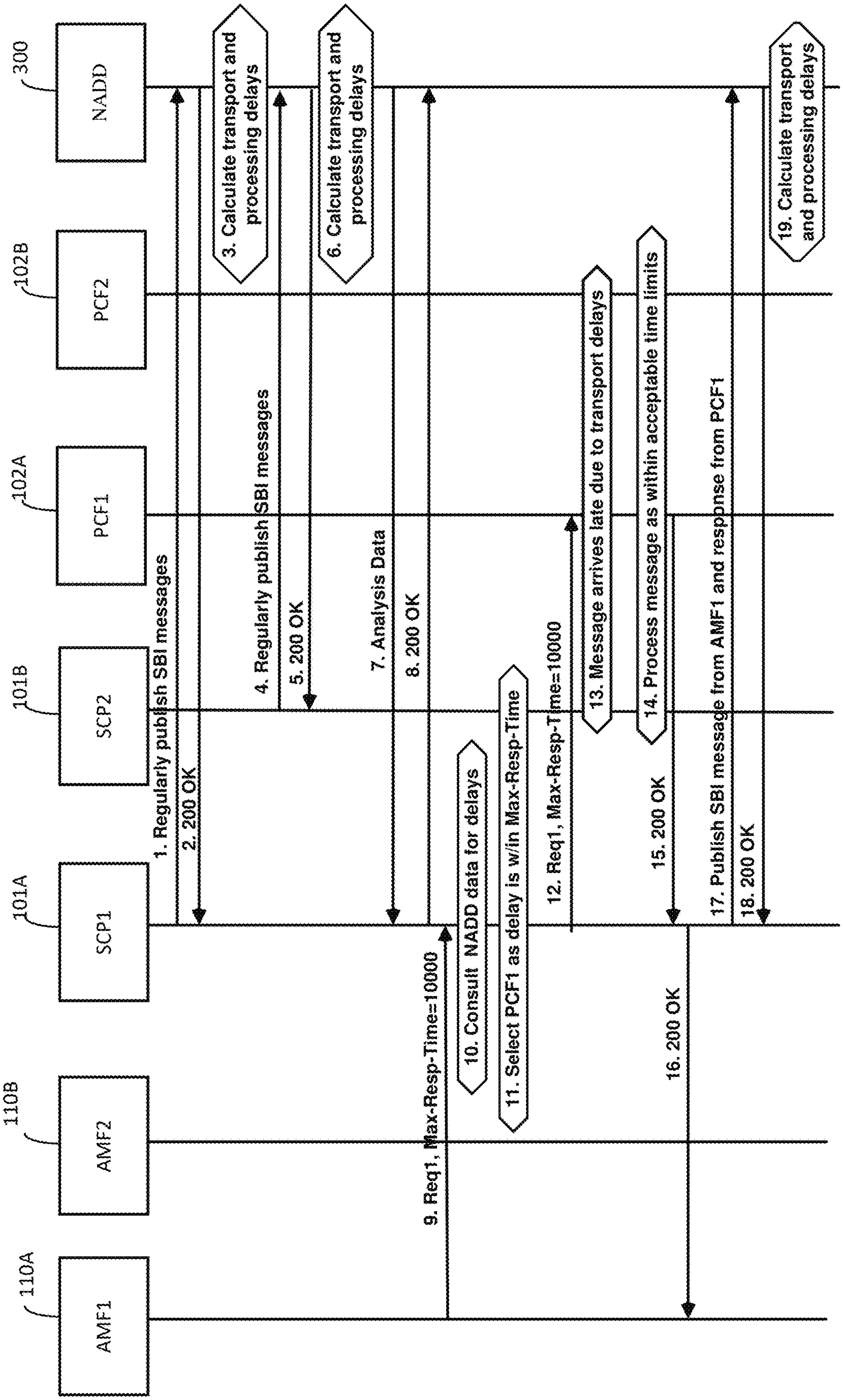
FIGS. 3A and 3B are a message flow diagram illustrating the use of the NADD to calculate producer NF processing and transport delays and provide the delay values to consumer NFs, where the consumer NFs use the delay values to perform producer NF selection.
Figure 3B:
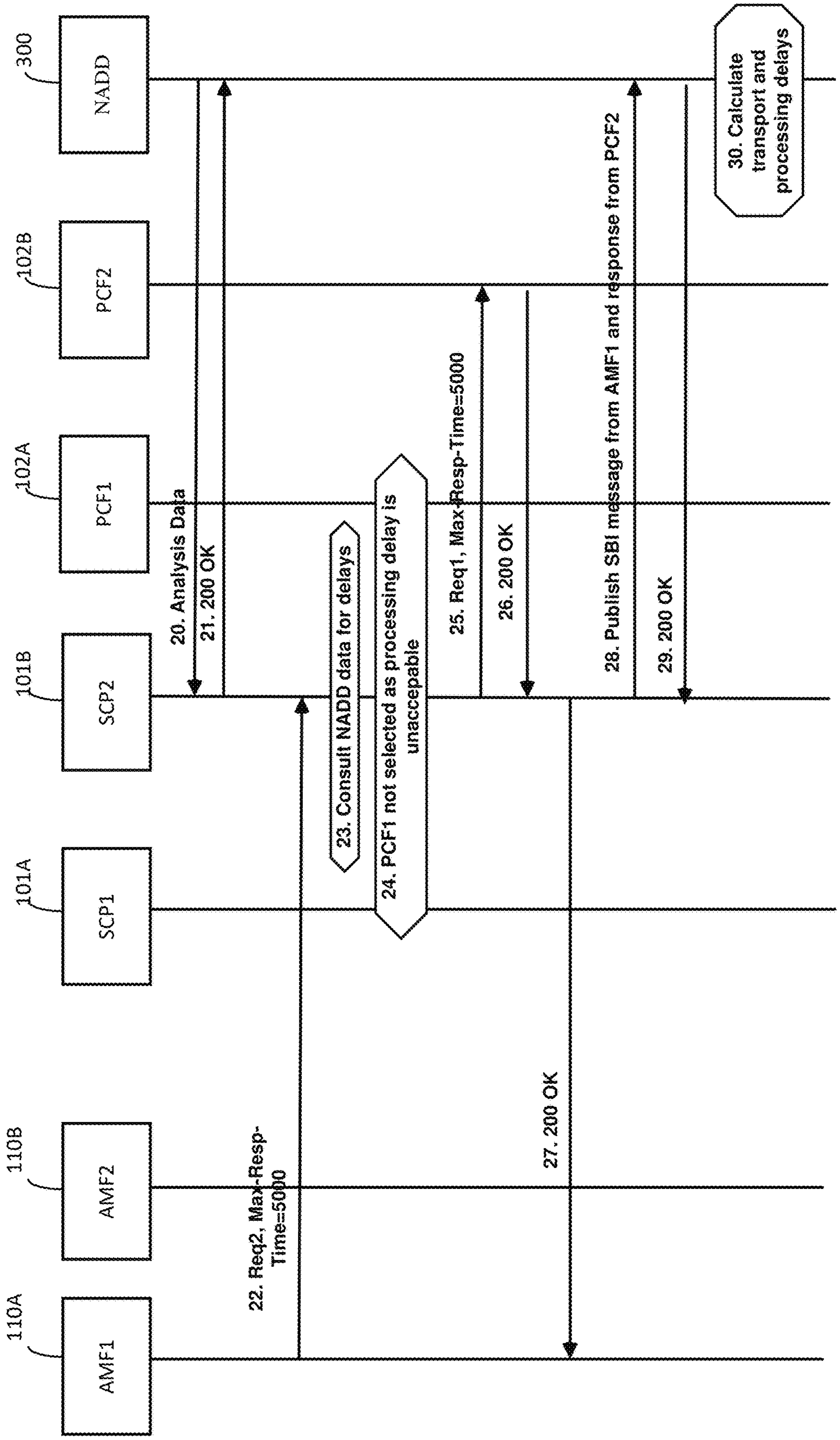

NF service consumers may report SBI messages to a network analytics data director (NADD) by sending copies of SBI messages transmitted and received by the NF service consumers to the NADD. The NADD calculates the processing and transport delays for each NF service producer and makes the data available for other NF service consumers to utilize for NF service producer selection. FIGS. 3A and 3B are a message flow diagram illustrating the use of the NADD to calculate producer NF processing and transport delays and provide the delay values to consumer NFs, where the consumer NFs use the delay values to perform producer NF selection. Referring to FIG. 3A, in step 1, SCP 101A publishes SBI messages to NADD 300. In step 2, NADD 300 sends a 200 OK message to SCP 101A confirming receipt of the messages. In step 3, NADD 300 calculates transport and processing delays based on the messages. For example, a combined transport and processing delay value for a consumer NF and a producer NF may be the difference between a time when SCP 101A transmits an SBI request to a producer NF and the time when SCP 101A receives a corresponding response from the producer NF. NADD 300 may report the processing and transport delays to SCPs functioning as consumer NFs in the response messages or in response to queries from the SCPs. NADD 300 may maintain a database of delay values for each producer NF and may continually update the delay values as new SBI messages are received in the message feeds from the consumer NFs.

In step 4, SCP 101B publishes SBI messages to NADD 300. In step 5, NADD 300 sends a 200 OK message to SCP 101B. In step 6, NADD 300 calculates processing and transport delays for the SBI messages received from SCP 101B. In step 7, NADD 300 publishes analysis data, including the delay value for PCF 102A, to SCP 101A. In step 8, SCP 101A responds with a 200 OK message.

In step 9, AMF 110A sends an SBI request to SCP 101A. The SBI request includes a 3gpp-Sbi-Max-Rsp-Time header carrying a value of 10000 ms. In step 10, SCP 101A consults its local database of delay values received from NADD 300 for delays associated with producer NFs capable of providing the service identified in the SBI request message. For example, SCP 101A may look up, in a producer NF delay transport and processing delay database maintained by SCP 101A, the NF instance IDs of the producer NFs capable of providing the service and read the corresponding delay values from the database. SCP 101A may identify as candidate recipients for the SBI request message, the producer NFs whose delay values indicate that the producer NFs can process the message within the maximum response time and may exclude as candidates, the producer NF that are not capable of processing the message within the maximum response time. In one example, SCP 101A may exclude, as candidates for processing the SBI request message, producer NFs for which the calculated delay value exceeds:

(sender timestamp + max response time)−current time, where current time is a current time at the SCP when the SCP receives the SBI request message, sender timestamp is a timestamp value obtained from a 3gpp-Sbi-Sender-Timestamp header of the SBI request message, and max response time is the maximum response time value obtained from the 3gpp-Sbi-Max-Rsp-Time header of the SBI request message.

In step 11, SCP 101A selects PCF 102A to process the SBI request because PCF 102A has a delay value that does not prevent PCF 102A from providing a response within the maximum response time specified by AMF 110A. In step 12, SCP 101A sends the SBI request to PCF 102A. In step 13, the message arrives late (but within the maximum response time) at PCF 102A due to transport delays. In step 14, PCF 102A processes the SBI request because the SBI request is not received too late for PCF 102A to process the message within the maximum response time. In step 15, PCF 102A sends a 200 OK message to SCP 101A. In step 16, SCP 101A sends the 200 OK message to AMF 110A. In step 17, SCP 101A publishes the SBI request message from AMF 110A and the corresponding response from PCF 102A to NADD 300. In step 18, NADD 300 responds with a 200 OK message. In step 19, NADD 300 updates the delay value calculated for PCF 102A.

Referring to FIG. 3B, in step 20, NADD 300 provides analysis data including the calculated processing and transport delay of PCF 102A to SCP 101B. In step 21, SCP 101B responds with a 200 OK message. In step 22 AMF 110A sends an SBI request to SCP 101B. The SBI request includes a 3gpp-Sbi-Max-Rsp-Time header carrying a value of 5000 milliseconds. In step 23, SCP 101B consults its NADD data for delays of producer NFs capable of providing the service identified in the SBI request message. SCP 101B, in step 24, excludes PCF 102A as a candidate for processing the SBI request message because SCP 101B determines that the delay value of PCF 102A is such that PCF 102A cannot process the SBI request within the specified maximum response time. In step 25, SCP 101B sends the SBI request to PCF 102B. In step 26, PCF 102B responds with a 200 OK message. In step 27, SCP 101B sends the 200 OK message to AMF 110A. In step 28, SCP 101B publishes the SBI request received from AMF 110A and the corresponding response from PCF 102B to NADD 300. In step 29, NADD 300 responds with a 200 OK message. In step 30, NADD 300 calculates an updated transport and processing delay value for PCF 102B. Thus, in the steps illustrated in FIGS. 3A and 3B, using NADD-provided transport and processing delays, producer NF selection is made more efficient by avoiding selection of producer NFs that cannot process an SBI request message within a specified maximum response time.

Figure 4:
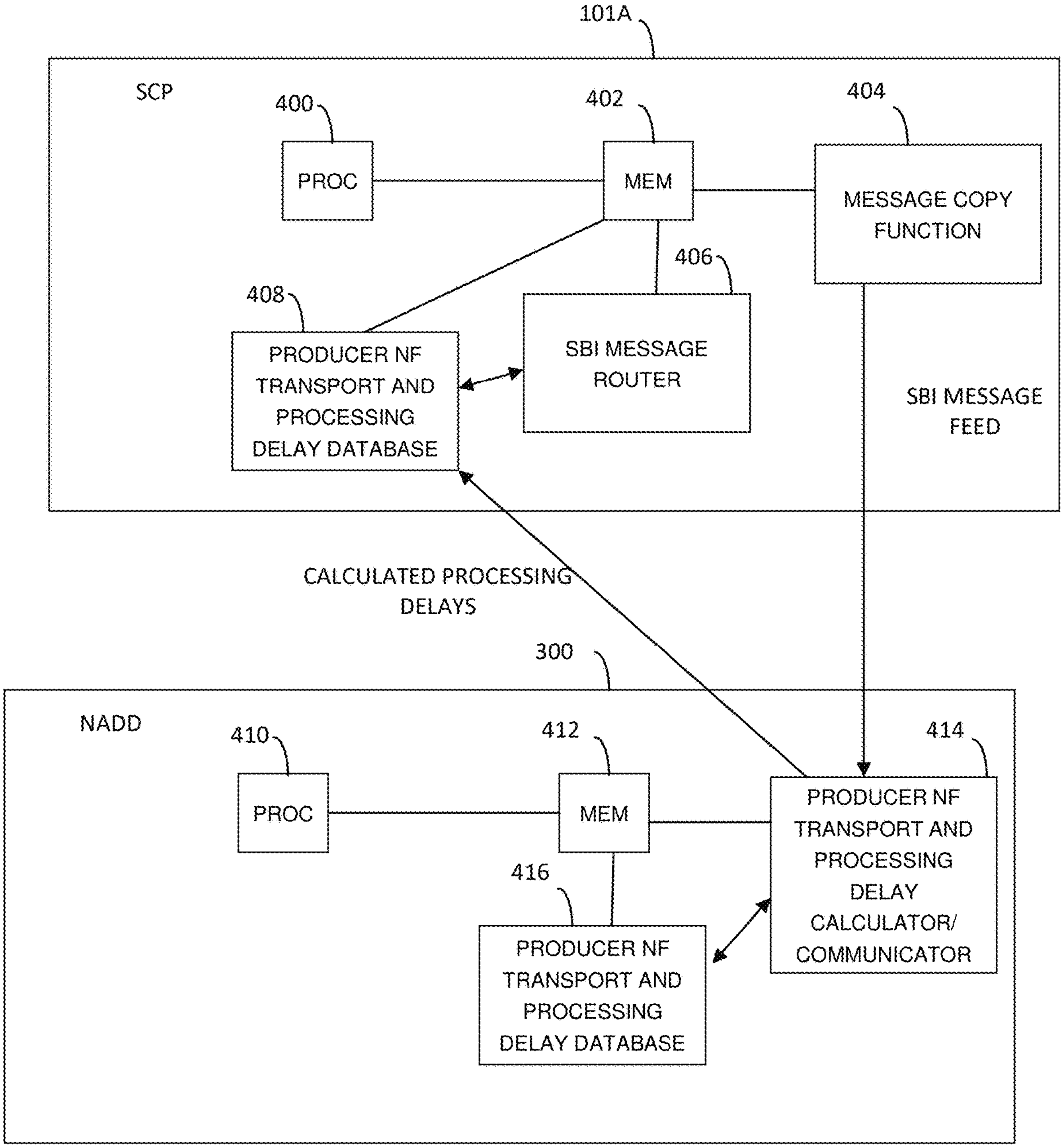
FIG. 4 is a block diagram illustrating an exemplary architecture for an SCP and an NADD for NADD-assisted producer NF selection.

FIG. 4 is a block diagram illustrating an exemplary architecture for an SCP and an NADD for calculating, communicating, and using producer NF delay values to perform producer NF selection. Referring to FIG. 4, SCP 101A includes at least one processor 400 and a memory 402. SCP 101A includes a message copy function 404 that copies SBI request messages and provides the SBI request message copies to NADD 300. SCP 101A further includes an SBI message router 406 that performs producer NF selection based on transport and processing delays stored in a local copy of a producer NF transport and processing delay database 408. Message copy function 404 and SBI message router 406 may be implemented using computer executable instructions stored in memory 402 and executed by processor 400.

NADD 300 includes at least one processor 410 and memory 412. NADD 300 includes a producer NF transport and processing delay calculator/communicator 414 for receiving messages copied by message copy function 404, calculating transport and processing delays of producer NFs, and providing the transport and processing delays to consumer NFs, such as SCP 101A. NADD 300 also includes a producer NF transport and processing delay database 416 in which NADD 300 continually updates transport and processing delays for producer NFs based on the messages copied by message copy function 404. Producer NF transport and processing delay calculator/communicator 414 may be implemented using computer executable instructions stored in memory 412 and executed by processor 410.

Figure 5:
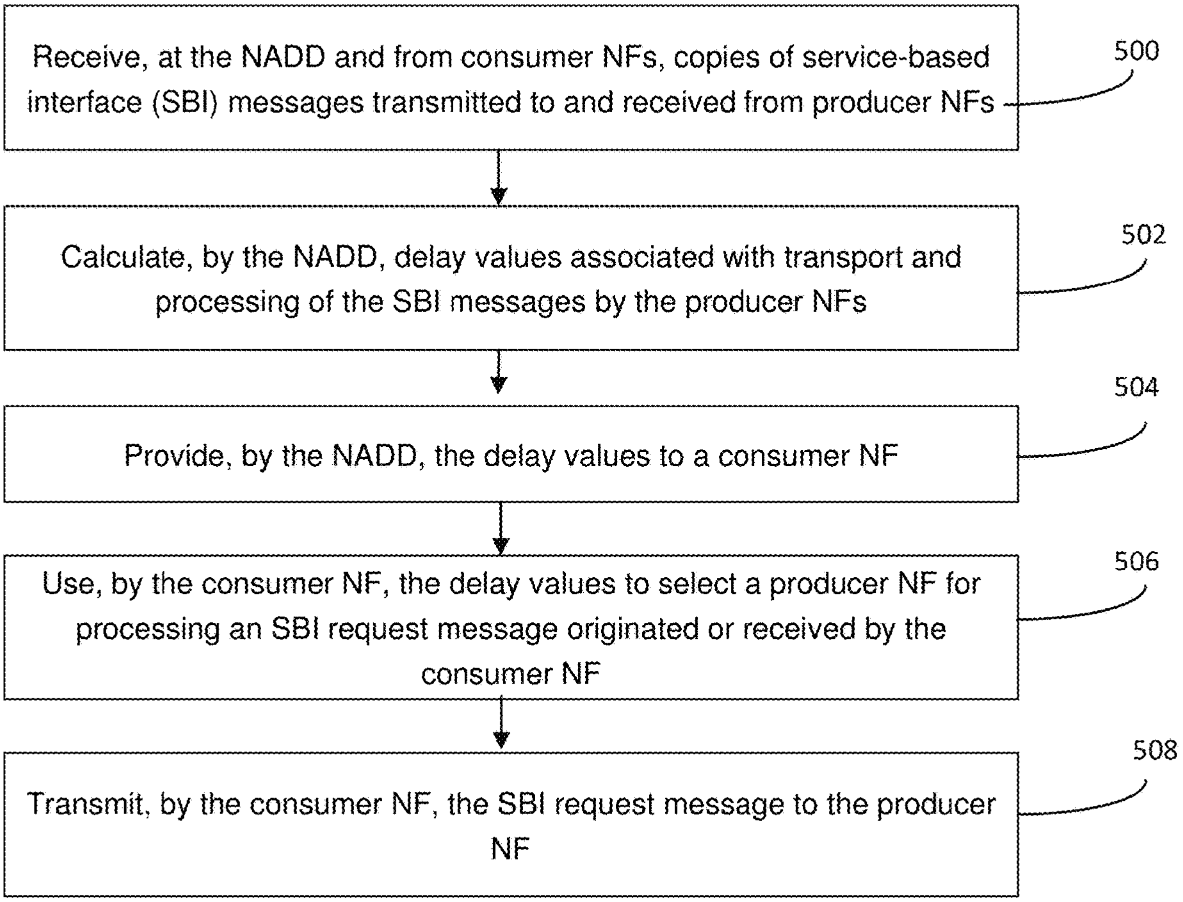
FIG. 5 is a flow chart illustrating an exemplary process for NADD-assisted producer NF selection.

FIG. 5 is a flow chart illustrating an exemplary process for NADD-assisted producer NF selection. Referring to FIG. 5, in step 500, the process includes receiving, at the NADD and from consumer NFs, copies of service-based interface (SBI) messages transmitted to and received from producer NFs. For example, consumer NFs, including SCPs operating as consumer NFs, may provide a feed to the NADD that includes copies of SBI request messages transmitted by the consumer NFs and SBI response messages received by the consumer NFs.

In step 502, the process further includes calculating, by the NADD, delay values associated with transport and processing of the SBI messages by the producer NFs. For example, the NADD may calculate a processing and transport delay value for a producer NF as a difference in time between the time that a consumer NF transmitted an SBI request to the producer NF and the consumer NF received an SBI response from the producer NF. In one example, the NADD may calculate average or median delay values for producer NFs and continually update the delay values as new SBI request and response message copies are provided to the NADD.

In step 504, the process further includes providing, by the NADD, the delay values to a consumer NF. For example, the NADD may periodically provide updated delay values to a consumer NF or in response to queries from the consumer NF.

In step 506, the process further includes using, by the consumer NF, the delay values to select a producer NF for processing an SBI request message originated or received by the consumer NF. For example, the consumer NF may exclude, as candidates for processing an SBI request message, producer NFs whose delay values indicate that the producer NF would not be able to process the SBI request message within the maximum response time specified by the message originator. The consumer NF may select from producer NFs that are capable of providing the service requested in the SBI request message and for which the delay values indicate that the producer NF is capable of processing the SBI request message within the maximum response time specified by the message originator.

In step 508, the process includes transmitting, by the consumer NF, the SBI request message to the producer NF. For example, the consumer NF may transmit the SBI request message to the selected producer NF.

Exemplary advantages of the subject matter described herein include facilitating more efficient producer NF selection. Another advantage is that network resiliency is improved by reducing the likelihood that the NF service consumer will be required to send multiple SBI requests to obtain a given service. Transaction latency can also be reduced by avoiding the sending of messages that cannot be processed by producer NFs within a sender-specified time period. Processing resources of NF service consumers and NF service producers are conserved. The NADD-assisted producer NF selection described herein can be used by any NF acting as an NF service consumer.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.7.0 (2024-06)
2. 3rd Generation Partnership Project; Technical Specification Group Core Network and Terminals; 5G System; Technical Realization of Service Based Architecture; Stage 3 (Release 18) 3GPP TS 29.500 V18.6.0 (2024-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network analytics data director (NADD)-assisted producer network function (NF) selection, the method comprising:

receiving, at the NADD and from consumer NFs, copies of service-based interface (SBI) messages transmitted to and received from producer NFs;

calculating, by the NADD, delay values associated with transport and processing of the SBI messages by the producer NFs;

providing, by the NADD, the delay values to a consumer NF, wherein providing the delay values to the consumer NF includes providing the delay values to a service communication proxy (SCP);

using, by the SCP, the delay values to select a producer NF for processing an SBI request message originated or received by the SCP, wherein using the delay values to select a producer NF to process an SBI request message originated by or received by the SCP includes using, by the SCP, the delay values to select a producer NF to process an SBI request message received by the SCP, and wherein using the delay values to select a producer NF to process the SBI request message received by the SCP comprises excluding, as candidates for processing the SBI request message, producer NFs for which the calculated delay value exceeds:

(sender timestamp + max response time) − current time, where current time is a current time at the SCP when the SCP receives the SBI request message, sender timestamp is a timestamp value obtained from a 3gpp-Sbi-Sender-Timestamp header of the SBI request message, and max response time is a maximum response time value obtained from a 3gpp-Sbi-Max-Rsp-Time header of the SBI request message; and transmitting, by the SCP, the SBI request message to the producer NF.

2. The method of claim 1 wherein receiving the copies of the SBI messages includes receiving SBI message feeds from consumer NFs.

3. The method of claim 1 wherein receiving the copies of the SBI messages from the consumer NFs includes receiving the copies of the SBI request messages from at least one SCP.

4. The method of claim 1 wherein calculating the delay values includes, for a producer NF, receiving copies of an SBI request message transmitted by the SCP and a corresponding SBI response message received by the SCP and calculating one of the delay values based on a difference in time between transmission of the SBI request message by the SCP and receipt of the SBI response message by the SCP.

5. The method of claim 1 wherein calculating the delay values includes calculating average or median delay values experienced by the consumer NFs in receiving services from the producer NFs.

6. The method of claim 1 wherein calculating the delay values includes continually updating the delay values based on the SBI messages transmitted to and received from the producer NFs.

7. The method of claim 1 wherein providing the delay values to the SCP includes providing the delay values as part of an analytics data feed from the NADD to the SCP and/or in response to queries from the SCP.

8. A system for network analytics data director (NADD)-assisted producer network function (NF) selection, the system comprising:

a network analytics data director (NADD) including at least one processor for receiving, at the NADD and from consumer NFs, copies of service-based interface (SBI) messages transmitted to and received from producer NFs, calculating delay values associated with transport and processing of the SBI messages by the producer NFs, and communicating the delay values to other NFs; and a consumer NF including at least one processor for receiving, from the NADD, the delay values, using the delay values to select a producer NF for processing an SBI request message originated or received by the consumer NF, and transmitting the SBI request message to the producer NF, wherein the consumer NF comprises a service communication proxy (SCP), wherein the SCP is configured to use the delay values to select a producer NF to process an SBI request message received by the SCP, and wherein the SCP is configured to exclude, as candidates for processing the SBI request message, producer NFs for which the calculated delay value exceeds:

(sender timestamp + max response time) − current time, where current time is a current time at the SCP when the SCP receives the SBI request message, sender timestamp is a timestamp value obtained from a 3gpp-Sbi-Sender-Timestamp header of the SBI request message, and max response time is a maximum response time value obtained from a 3gpp-Sbi-Max-Rsp-Time header of the SBI request message.

9. The system of claim 8 wherein the NADD is configured to receive the copies of the SBI messages includes receiving SBI message feeds from consumer NFs.

10. The system of claim 8 wherein the NADD is configured to receive the copies of the SBI request messages from at least one SCP.

11. The system of claim 8 wherein the NADD is configured to calculate the delay values by, for a producer NF, receiving copies of an SBI request message transmitted by the SCP and a corresponding SBI response message received by the SCP and calculating one of the delay values based on a difference in time between transmission of the SBI request message by the SCP and receipt of the SBI response message by the SCP.

12. The system of claim 8 wherein the NADD is configured to calculate the delay values by calculating average or median delay values experienced by the consumer NFs in receiving services from the producer NFs.

13. The system of claim 8 wherein the NADD is configured to continually update the delay values based on the SBI messages transmitted to and received from the producer NFs.

14. One or more non-transitory computer readable media having stored thereon executable instructions that when executed by one or more processors control the one or more processors to perform steps comprising:

receiving, at a network analytics data director (NADD) and from consumer NFs, copies of service-based interface (SBI) messages transmitted to and received from producer NFs;

calculating, by the NADD, delay values associated with transport and processing of the SBI messages by the producer NFs;

providing, by the NADD, the delay values to a consumer NF, wherein providing the delay values to the consumer NF includes providing the delay values to a service communication proxy (SCP);

using, by the SCP, the delay values to select a producer NF for processing an SBI request message originated or received by the SCP, wherein using the delay values to select a producer NF to process an SBI request message originated by or received by the SCP includes using, by the SCP, the delay values to select a producer NF to process an SBI request message received by the SCP and wherein using the delay values to select a producer NF to process the SBI request message received by the SCP comprises excluding, as candidates for processing the SBI request message, producer NFs for which the calculated delay value exceeds:

$$(\text{sender timestamp} + \text{max response time}) - \text{current time, where}$$

current time is a current time at the SCP when the SCP receives the SBI request message, sender timestamp is a timestamp value obtained from a 3gpp-Sbi-Sender-Timestamp header of the SBI request message, and max response time is a maximum response time value obtained from a 3gpp-Sbi-Max-Rsp-Time header of the SBI request message; and transmitting, by the SCP, the SBI request message to the producer NF.

* * * * *